United States Patent
Jiang

(10) Patent No.: US 6,609,437 B2
(45) Date of Patent: Aug. 26, 2003

(54) HANDLEBAR STEM STRUCTURE

(76) Inventor: Cheng-Xun Jiang, No. 447, Guojung Rd., Dali City, Taichung (TW)

( * ) Notice: Subject to any disclaimer, the term of this patent is extended or adjusted under 35 U.S.C. 154(b) by 0 days.

(21) Appl. No.: 09/972,888

(22) Filed: Oct. 10, 2001

(65) Prior Publication Data

US 2003/0066376 A1 Apr. 10, 2003

(51) Int. Cl.[7] .......................... B62K 21/12; B62K 21/16
(52) U.S. Cl. ...................... 74/551.1; 280/279; 403/344
(58) Field of Search .................. 74/551.1–551.8; 280/279, 276, 277; 403/344, 373; 428/113, 292.1–296.7

(56) References Cited

U.S. PATENT DOCUMENTS

| 5,241,881 A | * | 9/1993 | Chen .......................... 74/551.2 |
| 5,557,982 A | * | 9/1996 | Voss et al. ................. 74/551.1 |
| 6,309,135 B1 | * | 10/2001 | Thomson et al. ........... 403/344 |

FOREIGN PATENT DOCUMENTS

| EP | 0 736 447 A1 | * | 9/1996 | ................ 74/551.4 |
| GB | 2300841 A | * | 11/1996 | ................ 74/551.3 |
| JP | 7-251779 | * | 10/1995 | ................ 74/551.1 |
| WO | WO 94/18057 | * | 8/1994 | ................ 74/551.3 |
| WO | WO 95/25034 | * | 9/1995 | ................ 74/551.3 |

* cited by examiner

Primary Examiner—Vinh T. Luong
(74) Attorney, Agent, or Firm—Rosenberg, Klein & Lee

(57) ABSTRACT

A handlebar stem structure includes a tube having two connection members and two extensions are movably connected to the two connection members. Each of the two extensions has two connection ports. An outer layer is coated to the tube and the connection members, wherein the connection ports extend from the outer layer and a first recess is defined in the outer layer. A retaining member is connected to the two connection ports and a second recess is defined in an inside of the retaining member. The first recess and the second recess are matched to form a passage for receiving a handlebar.

3 Claims, 6 Drawing Sheets

HANDLEBAR STEM STRUCTURE

FIELD OF THE INVENTION

The present invention relates to a handlebar stem structure that includes two extensions threadedly connected to a tube and a resin layer and a fiber layer are coated to the extensions and the tube.

BACKGROUND OF THE INVENTION

A conventional bicycle handlebar stem is a one-piece member which is made by metal. One end of the handlebar stem is connected to the steerer tube extending from the head tube, the other end of the handlebar is connected to the handlebar. The metal handlebar stem is too heavy and does not meet the requirement of the modern design of bicycles. Manufacturers develop a handlebar stem that is made by composite material. This type of handlebar stem is composed of two parts which connected by bolts. Each part requires a set of mold and the length of the handlebar stem is fixed so that the manufacturers need many sets of molds for manufacturing the handlebars having different length.

SUMMARY OF THE INVENTION

In accordance with one aspect of the present invention, there is provided a handlebar stem structure which comprises a tube for receiving a steerer tube and the tube has two connection members extending radially outward from an outer periphery of the tube. Two extensions are movably connected to the two connection members. Each of the two extensions has two connection ports. An outer layer is coated to the tube and the connection members. The connection ports extend from the outer layer and a first recess is defined in the outer layer. A retaining member is connected to the two connection ports and a second recess is defined in an inside of the retaining member. The first recess and the second recess are matched to form a passage for receiving a handlebar.

The primary object of the present invention is to provide a handlebar stem whose length can be adjustable before being coated with the outer layer.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
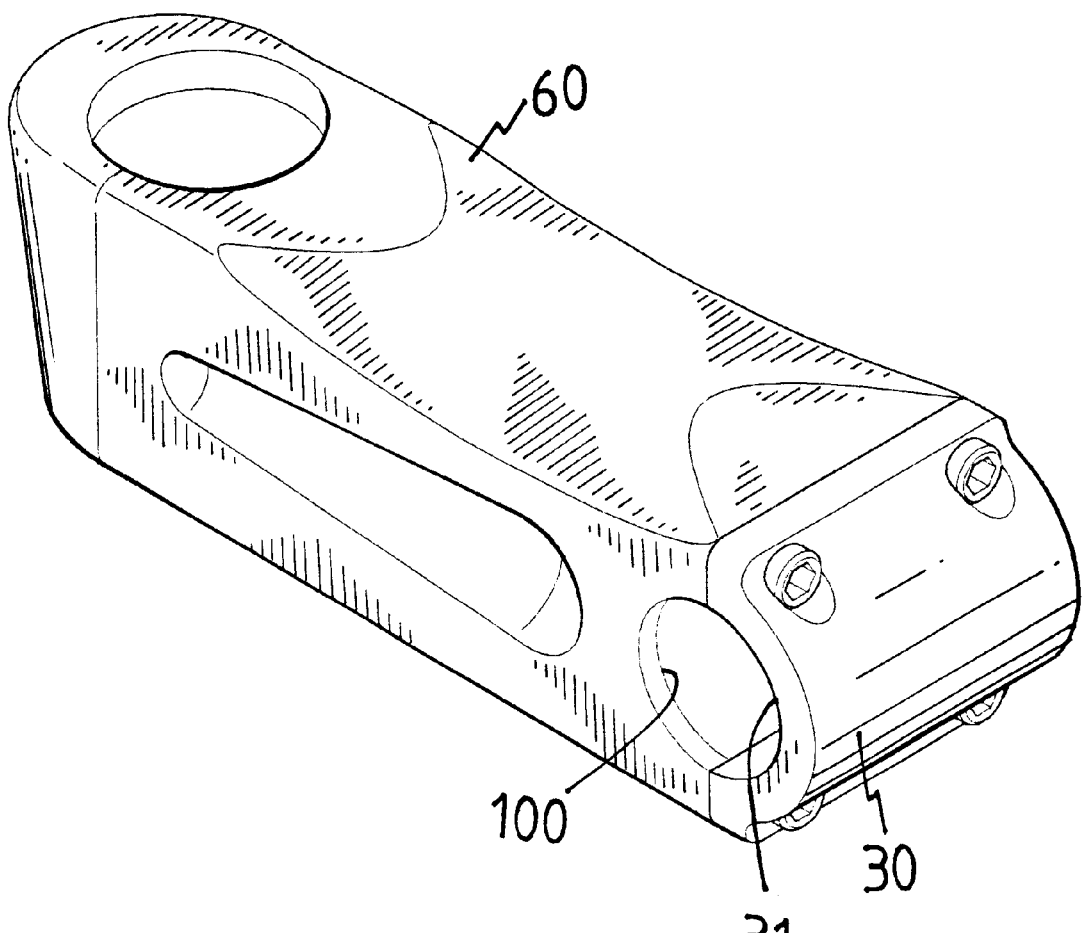
FIG. 1 is a perspective view to show the handlebar stem of the present invention.
Figure 2:
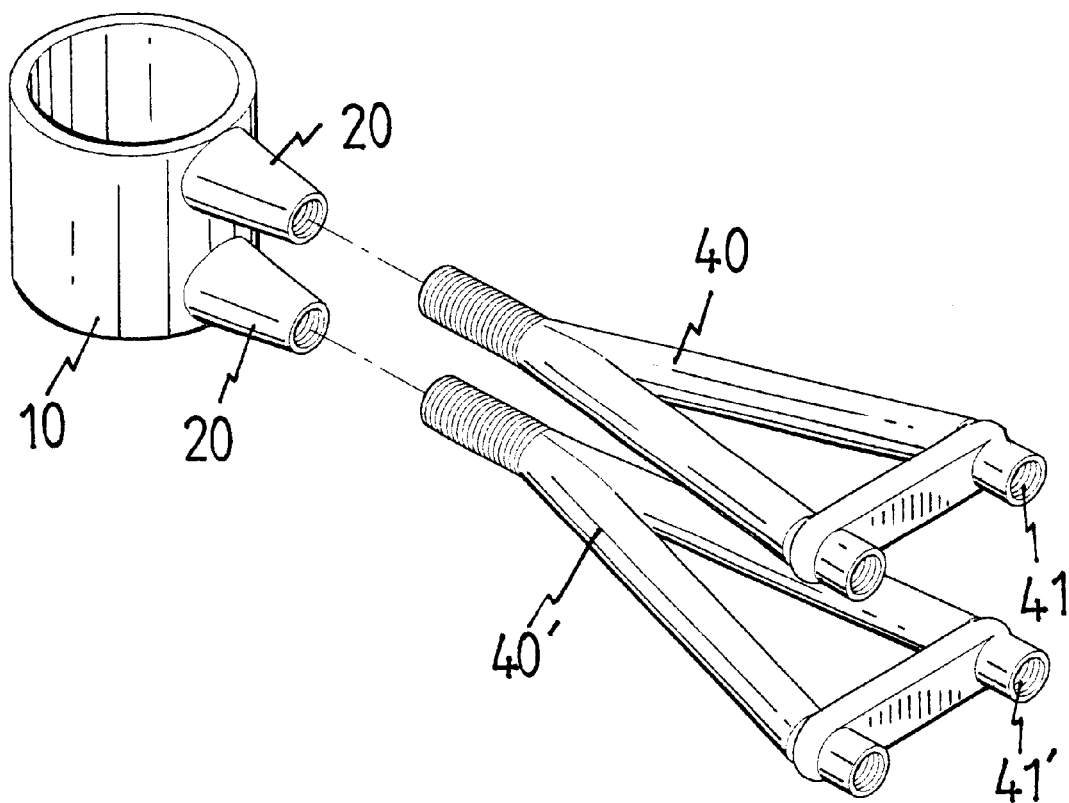
FIG. 2 is an exploded view to show the tube and the two extensions of the handlebar stem of the present invention.
Figure 3:
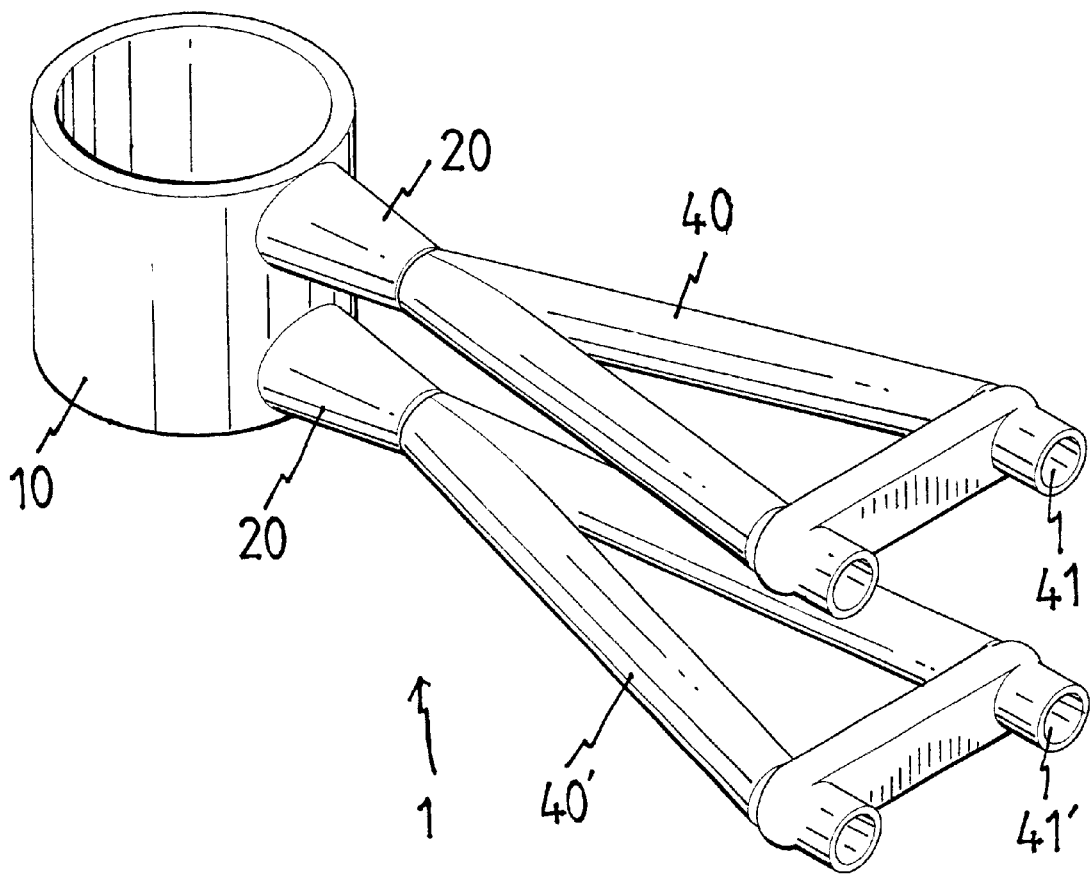
FIG. 3 is a perspective view to show the handlebar stem of the present invention.
Figure 4:
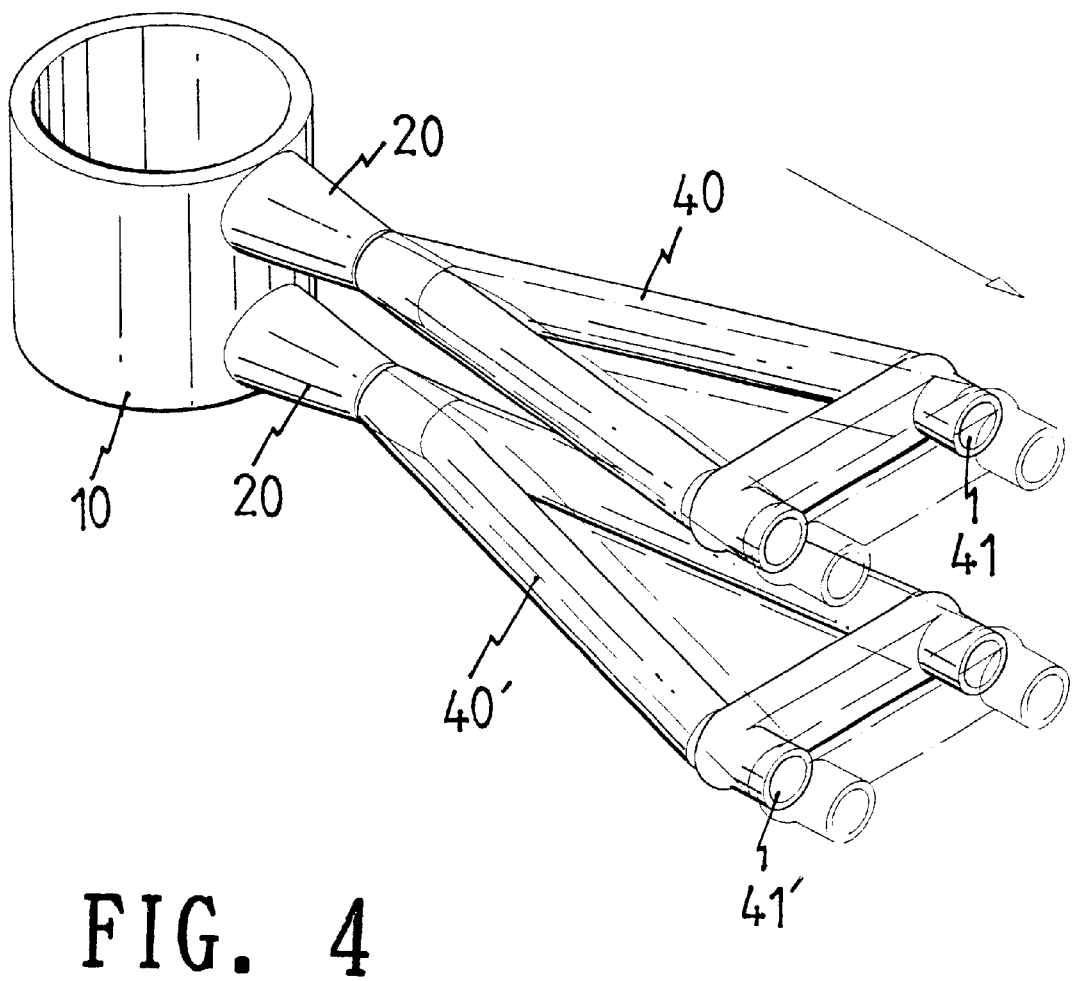
FIG. 4 shows that the two extensions can be moved away from the tube.

Referring to FIGS. 1 to 3, the handlebar stem of the present invention comprises a tube 10 having two connection members 20 extending radially outward from an outer periphery of the tube 10. Each connection member 20 has a threaded hole defined in a distal end thereof. Two extensions 40, 40' each have a threaded end at one end thereof and the two extensions 40, 40' are movably connected to the two connection members 20 by engaging the threaded ends in the threaded holes of the connection members 20. Two connection ports 41, 41' are connected to the other end of each of the two extensions 40, 40'.

Figure 5:
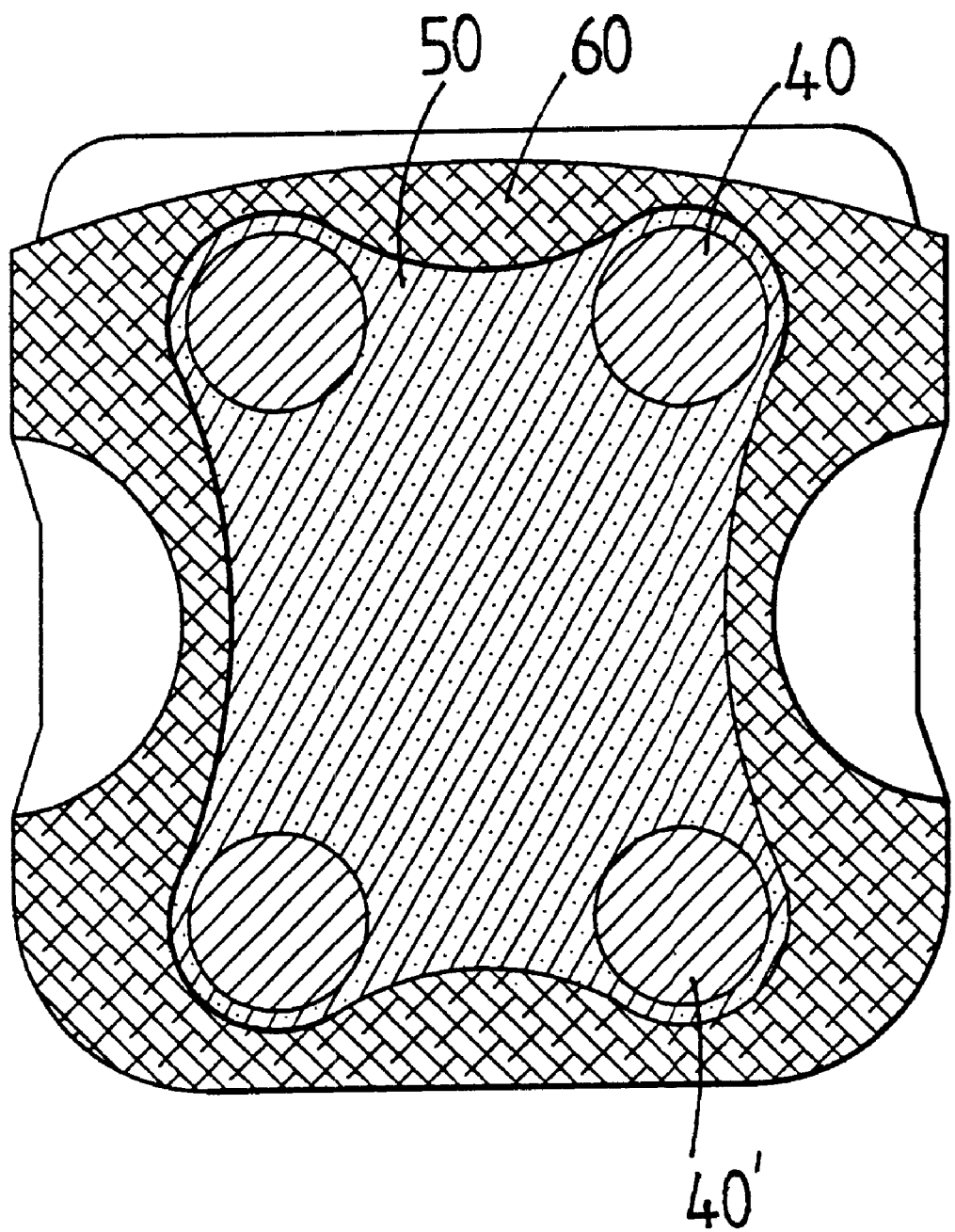
FIG. 5 is a cross sectional view to show the outer layer of the handlebar stem of the present invention.

Referring to FIG. 5, an outer layer is coated to the tube 10 and the connection members 20. The connection ports 41, 41' extend from the outer layer and a first recess 100 is defined in the outer layer. The outer layer includes a resin layer 50 and a fiber layer 60 which is coated on the resin layer 50. The tube 10 is mounted to a steerer tube (not shown).

Figure 6:
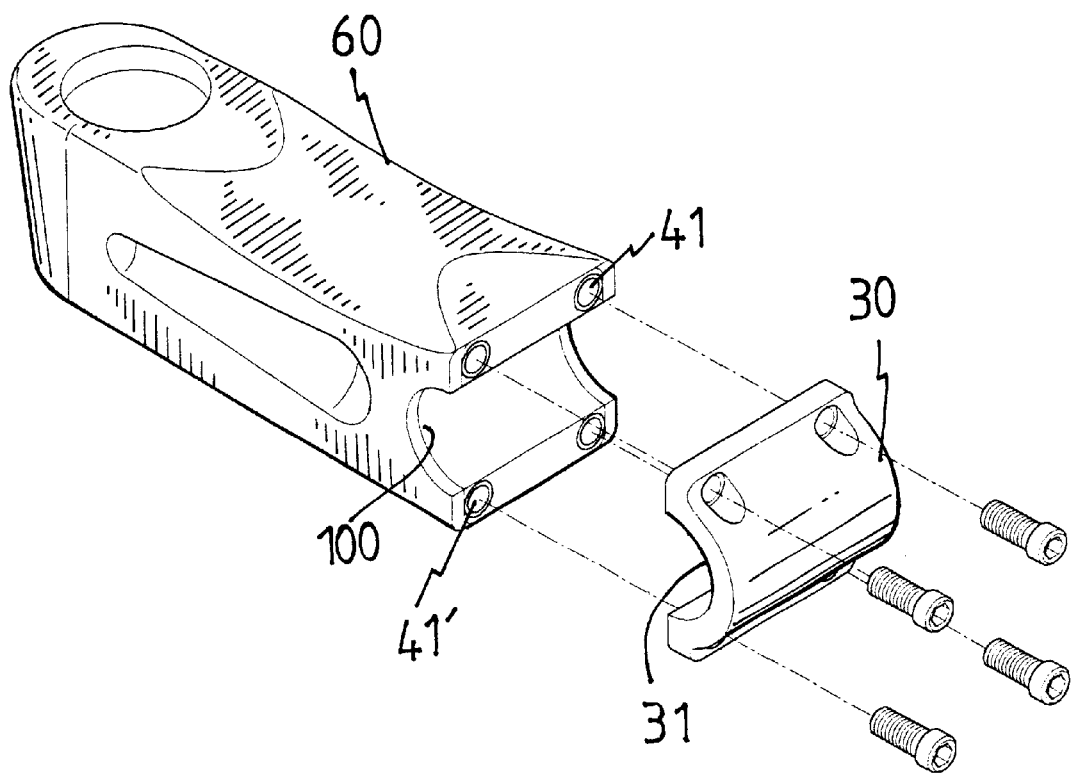
FIG. 6 is an exploded view to show a retaining member and the handlebar stem of the present invention.

Referring to FIG. 6, a retaining member 30 is connected to the two connection ports 41, 41' and a second recess 31 is defined in an inside of the retaining member 30. The first recess 100 and the second recess 31 are matched to form a passage so as to receive a handlebar (not shown).

The length of the handlebar stem can be adjusted before the outer layer is coated so that the manufacturers can conveniently manufacture the handlebar stems without using too many sets of molds.

While we have shown and described the embodiment in accordance with the present invention, it should be clear to those skilled in the art that further embodiments may be made without departing from the scope of the present invention.

What is claimed is:

1. A handlebar stem structure comprising:

a tube having two connection members extending radially outward from an outer periphery of said tube, two extensions movably connected to said two connection members, each of said two extensions having two connection ports;

an outer layer coated to said tube and said connection members, said connection ports extending from said outer layer and a first recess defined in said outer layer, and a retaining member connected to said two connection ports and a second recess defined in an inside of said retaining member, said first recess and said second recess being matched to form a passage.

2. The handlebar stem structure as claimed in claim 1, wherein said connection members each have a threaded hole and each of said extensions having a threaded end which is threadedly engaged with respective one of said two threaded holes.

3. The handlebar stem structure as claimed in claim 1, wherein said outer layer includes a resin layer and a fiber layer which is coated on said resin layer.

\* \* \* \* \*